(12) United States Patent  
Chevalier et al.

(10) Patent No.: US 8,693,602 B2  
(45) Date of Patent: Apr. 8, 2014

(54) METHOD AND DEVICE FOR MONO- AND MULTI-ANTENNA RECEPTION FOR ALAMOUTI-TYPE LINKS

(75) Inventors: Pascal Chevalier, Colombes (FR); Florian Dupuy, Colombes (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 13/508,036

(22) PCT Filed: Nov. 3, 2010

(86) PCT No.: PCT/EP2010/066725  
§ 371 (c)(1),  
(2), (4) Date: Jun. 14, 2012

(87) PCT Pub. No.: WO2011/054857  
PCT Pub. Date: May 12, 2011

(65) Prior Publication Data  
US 2012/0300862 A1    Nov. 29, 2012

(30) Foreign Application Priority Data  
Nov. 3, 2009  (FR) ..................................... 09 05263

(51) Int. Cl.  
*H04B 1/12*   (2006.01)  
*H04B 15/00*  (2006.01)  
*H04W 4/20*   (2009.01)  
*H04J 1/12*   (2006.01)

(52) U.S. Cl.  
USPC ........... 375/350; 375/343; 375/340; 375/316; 375/346; 375/144; 375/141; 375/140; 375/130; 370/342; 370/343; 370/310; 370/203; 370/208; 370/209; 370/491; 370/480; 370/464

(58) Field of Classification Search  
USPC ......... 375/260, 259, 341, 340, 316, 347, 346, 375/267, 350, 232, 230, 229, 343, 144, 141, 375/140, 130; 370/210, 203, 342, 343, 310, 370/208, 209, 491, 480, 464  
See application file for complete search history.

(56) References Cited

U.S. PATENT DOCUMENTS

| 2003/0227410 A1 | 12/2003 | Ferreol et al. |
| 2004/0247054 A1 | 12/2004 | Ferreol et al. |

(Continued)

FOREIGN PATENT DOCUMENTS

WO    2007/094786 A1    8/2007

OTHER PUBLICATIONS

Gerstacker, W.H.; Obernosterer, F.; Schober, R.; Lehmann, A.T.; Lampe, A.; Gunreben, P., "Equalization concepts for Alamouti's space-time block code," Communications, IEEE Transactions on , vol. 52, No. 7, pp. 1178,1190, Jul. 2004.*

(Continued)

*Primary Examiner* — Chieh M Fan  
*Assistant Examiner* — Michelle M Koeth  
(74) *Attorney, Agent, or Firm* — Baker & Hostetler, LLP

(57) ABSTRACT

Method and system for separating a plurality of users in a communication system including two transmitter antennas and N receiver antennas, said signals transmitted by said users containing symbols $a_n$, $x()$ corresponding to the vector of the envelopes of the output signals of the 1 to N receiver antennas after a shaping filtering operation, characterized in that it uses a linear mean square filter extended over an observation vector $\tilde{x}=[x(2n-1)^T\ x(2n)^T\ x(2n-1)^H\ x(2n)^H]^T$ where $x(2n-1)$ and $x(2n)$ correspond to the $(N\times1)$ $(N\geq1)$ observations at the symbol times $2n-1$ and $2n$.

10 Claims, 2 Drawing Sheets

(56) References Cited

U.S. PATENT DOCUMENTS

| | | | |
|---|---|---|---|
| 2004/0260522 A1 | 12/2004 | Albera et al. | |
| 2006/0039499 A1* | 2/2006 | Chae et al. | 375/299 |
| 2006/0182193 A1 | 8/2006 | Monsen | |
| 2007/0026833 A1* | 2/2007 | Kuchi | 455/296 |

OTHER PUBLICATIONS

S. M. Alamouti et al.: "A simple transmit diversity technique for wireless communications," IEEE Journal on Selected Areas in Communications, vol. 16, No. 8, pp. 1451-1458, Oct. 1998.

A. F. Naguib et al.: "Applications of space-time block codes and interferences suppression for high capacity and high data rate wireless systems," Proc. 32nd Annual Asilomar Conference on Signals, Systems and Computer, pp. 1803-1810, Pacific Grove, California, Nov. 1998.

A. F. Naguib et al.: "Space-time coding and signal processing for high data rate wireless communications," IEEE Signal Processing Magazine, vol. 17, No. 3, pp. 76-92, May 2000.

W. H. Gerstacker et al.: "Equalization Concepts for Alamouti's Space-Time Block Code," IEEE Transactions on Communications, IEEE Service Center, Piscataway, NJ, vol. 52, No. 7, Jul. 1, 2004, pp. 1178-1190.

S. Nayeb Nazar et al.: "Performance of blind channel estimation algorithms for space-frequency block coded multi-carrier coded division multiple access systems," IET Communications, vol. 2, No. 2, Feb. 1, 2008, pp. 320-328.

J. Via et al.: "On the Blind Identifiability of Orthogonal Space-Time Block Codes From Second-Order Statistics," IEEE Transactions on Information Theory, IEEE, vol. 54, No. 2, Feb. 1, 2008, pp. 709-722.

* cited by examiner

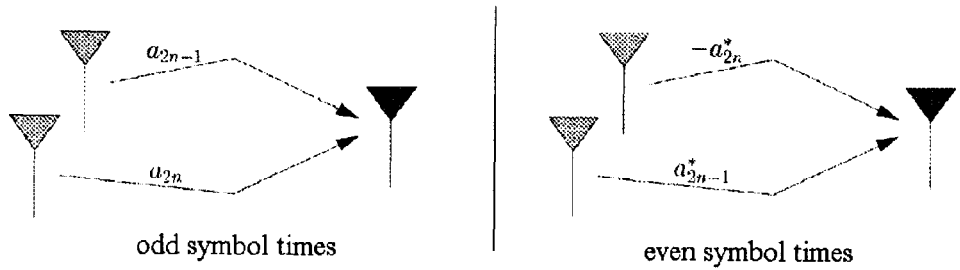
FIG.1
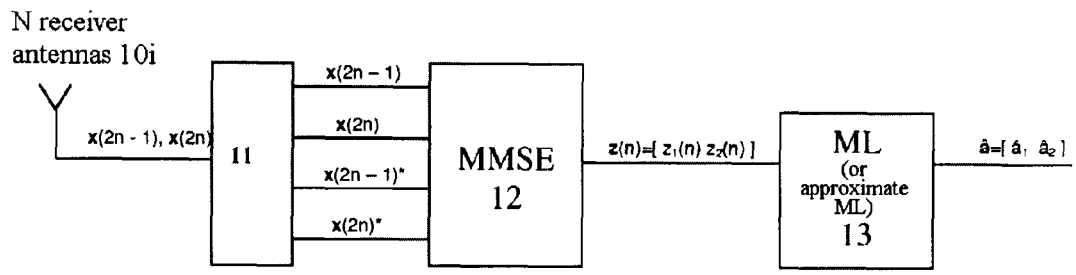
FIG.2
| channel | Rayleigh, constant over a burst |
|---|---|
| length of a burst | 112 useful symbols |
| of a learning sequence | 26 symbols |
| SNR | variant of -10 to +30 dB |
| constellation | 4-ASK : [-3 -1 +1 +3] |
| number of bursts | 100 000 |
| | |
FIG.3

METHOD AND DEVICE FOR MONO- AND MULTI-ANTENNA RECEPTION FOR ALAMOUTI-TYPE LINKS

CROSS-REFERENCE TO RELATED APPLICATIONS

This application is a National Stage of International patent application PCT/EP2010/066725, filed on Nov. 3, 2010, which claims priority to foreign French patent application No. FR 09 05263, filed on Nov. 3, 2009, the disclosures of each of which are incorporated by reference in their entireties.

FIELD OF THE DISCLOSED SUBJECT MATTER

The present patent application relates to a method for separating a plurality of users within a communication structure comprising one or more receiver antennas both in the absence and in the presence of interference external to the network. The invention also relates to a system for implementing the method.

BACKGROUND

Multiple-input/multiple-output (MIMO) systems offer the possibility of communication at high bit rates for multipath channels thanks to spatial multiplexing and space-time coding techniques used on transmission, without increasing the transmission band. Moreover, space-time codes (CST) also enable the range of the links to be increased and the links to be made reliable with no return loop between the receiver and the transmitter. Among space-time codes, orthogonal space-time codes (CSTO) are of very particular interest. They are designed to generate a maximum spatial diversity for a given number of transmitter and receiver antennas, and enable very simple optimum decoding (in the maximum likelihood sense). The simplest and most popular orthogonal space-time code was discovered by Alamouti [1] and has been adopted in numerous standards such as the UMTS (Universal Mobile Telecommunications Systems), DSM, EDGE, the IEEE standard 802.11 and the IEEE standard 802.16 [7]. It uses two transmitter antennas and is compatible with one or more receiver antennas.

Moreover, as spectrum is a rare and costly resource, increasing network capacity without increasing the band constitutes an undoubted challenge for cellular networks. It thus motivates the development of interference rejection techniques enabling a plurality of users to share the same spectral resources without impacting on the transmission quality for each user.

Multi-Antenna Techniques

In this context, a number of interference rejection techniques [22], [23] enabling (P+1) users to share the same channel at a given time have been developed in the last decade for users equipped with M antennas and using orthogonal space-time coding for transmission. It has been shown that in such an environment the symbols of each user may be demodulated with a diversity of order M if the receiver is equipped with N=MP+1 antennas. However, the number of receiver antennas may be reduced if the structure of the orthogonal space-time code is exploited. In this case, to obtain a diversity gain of order M and to reject P "spatio-temporal" users each having M transmitter antennas, the minimum number of receiver antennas required becomes N=P+1. Such an interference rejection structure has been proposed in [22], [23] for a receiver equipped with N=2 antennas and for P+1=2 co-channel users, each equipped with M=2 transmitter antennas and using Alamouti's orthogonal space-time code [1]. Generalization of this technique to P+1>2 users of Alamouti type with N>P receiver antennas has been proposed in the prior art. Finally, it is also known from the prior art to use an interference rejection technique enabling a receiver with N>P antennas to separate P+1 transmitted signals, each equipped with M>2 transmitter antennas and using a quasi-orthogonal space-time code whilst assuring for each user its reception with a diversity of order M(N−P).

Accordingly, receivers robust in the face of interference currently available and compatible with transmission using an orthogonal space-time code require a plurality of receiver antennas, whatever the constellation used. Moreover, the receivers available use only part of the information contained in the second order statistics of the observations. For this reason, they become sub-optimal if the part of the statistics of order two of the observations not used contains information. This is the case in particular in the presence of intranetwork interference (i.e. interference generated by the network itself) when the constellations used by the users are non-circular, such as the ASK (Amplitude Shift Keying), BPSK (Binary Phase Shift Keying) or rectangular QAM (Quadrature Amplitude Modulation) constellations. This is also the case, for all types of constellation, in the presence of interference external to the network, either non-circular or with a very narrow band.

Mono-Antenna Techniques

On the other hand, currently available interference robust mono-antenna receivers relate to mono-carrier single-input/single-output (SISO) connections. Of these techniques, those that exploit the non-circularity (or impropriety) of rectilinear constellations (with real values), such as ASK (Amplitude Shift Keying) or BPSK (Binary Phase Shift Keying) modulation, or constellations corresponding to complex filtering of rectilinear constellations such as MSK (Minimum Shift Keying) or GMSK (Gaussian MSK) modulation or OQAM (Offset Quadrature Modulation) have received very particular attention from specialists in this technical field. These techniques implant an optimum "Widely Linear" observation filter and enable separation of two users from the same antenna by using phase discrimination between the users, whence the SAIC (Single Antenna Interference Cancellation) concept. The potential of this concept combined with its low complexity are the reasons why 3G Americas presented the SAIC technology as a very strong improvement to GSM (Global System Mobile) receivers of portable type, simultaneously enabling a substantial increase in the system capacity of the GSM network. This technology was standardized in 2005 for GSM and has been operational in numerous mobile telephones since 2006. A new standardization of this concept, known as MUROS (Multi-User Reusing One Slot), is currently under investigation with the aim of enabling a plurality of GSM users to re-use the same TDMA (Time Division Multiple Access) time slot. Extension of the SAIC concept to multi-antenna reception is known as MAIC (Multiple Antenna Interference Cancellation) and is of great benefit for GPRS (General Packet Radio Service) networks in particular.

To the degree that the installation of a plurality of antennas on a mobile phone remains a technological challenge for 4th generation mobile telephones, because of problems of overall size and cost, the SAIC technology remains of great interest for 4th generation mobiles using a Wimax or LTE type OFDM (Orthogonal Frequency Division Multiplex) waveform. For this reason, extension of this technology to OFDM waveforms using ASK modulation and a single transmitter antenna, with a mono-antenna receiver, has featured in the prior art despite the fact that ASK modulation is less efficient, in energy terms, than QAM modulation with a similar number of states, supplementary degrees of freedom are available and may be exploited to reject interference on reception. Moreover, it is also known in the case of DS-CDMA networks and MIMO systems using the V-BLAST technology that transmission with real symbols and a "Widely Linear" receiver can generate a higher spectral efficiency than using a complex constellation and a linear receiver. Consequently, the use of an ASK constellation coupled to a "Widely Linear" receiver instead of a complex constellation with a linear receiver does not seem to be a limitation and may even bring advantages in terms of bit error rate and spectral efficiency.

In the context of MIMO systems, "Widely Linear" receivers have been used recently, implicitly or explicitly, to improve the reception of a user employing the spatial multiplexing V-BLAST technology. However, despite this work, extending SAIC/MAIC technologies to transmission using orthogonal space-time coding, such as Alamouti orthogonal space-time coding, has not been proposed.

SUMMARY

The object of this invention is notably to propose a new reception structure with N≥1 antennas, robust to interference both intra-network and external, for users employing two transmitter antennas conjointly with Alamouti orthogonal space-time coding. This new structure exploits all the information contained in the second order statistics of the observations. It thus offers better performance than the structures currently available for contexts in which the latter prove suboptimal. This is the case in particular in the presence of intra-network interferences for non-circular constellations or in the presence of non-circular external interferences or very narrow band interference for all types of constellations. In the particular case of rectilinear constellations (ASK, BPSK), the proposed receiver enables separation of 2N Alamouti users with N antennas, whence the capacity to separate two users, i.e. to reject intra-network interference, from one antenna. This result simultaneously extends the SAIC technology, available for SISO systems to rectilinear or quasi-rectilinear constellations (MSK, GMSK, OQAM), operational for the GSM, to Alamouti type MISO systems. This technology, a very simple alternative to very costly multi-user demodulation [42], enables circumvention of the technological challenges that the use of a plurality of antennas on mobiles still constitutes for 4th generation cellular radio communications because of problems of overall size and cost. Extending this concept to multi-antenna (MAIC) reception enables very high performance in terms of processing interference both internal and external to the network.

The present invention provides a method for separating a plurality of users in a communication system including two transmitter antennas and N receiver antennas, said signals transmitted by said users containing symbols $a_n$, x( ) corresponding to the vector of the envelopes of the output signals of the 1 to N receiver antennas after a shaping filtering operation, characterized in that it uses a linear mean square filter extended over an observation vector $\tilde{x}=[x(2n-1)^T \; x(2n)^T \; x(2n-1)^H \; x(2n)^H]^T$ where $x(2n-1)$ and $x(2n)$ correspond to the (N×1) (N≥1) observations at the symbol times 2n−1 and 2n.

The invention also provides a system for separating a plurality of users in a communication system including two transmitter antennas and N receiver antennas, said signals transmitted by said users containing symbols $a_n$, x( ) corresponding to the vector of the envelopes of the output signals of the 1 to N receiver antennas after a shaping filtering operation, characterized in that it includes a processor adapted to execute these steps of the method described above and in the following description.

The method and the system of the invention are notably used to process conjointly, coming from an array of N≥1 sensors, $P_{int}$ interferences internal and $P_{ext}$ interferences external to the network composed of $P_{rc}$ rectilinear and coherent interferences, $P_{rnc}$ rectilinear and non-coherent interferences, $P_{nrc}$ non-rectilinear and coherent interferences, and $P_{nrnc}$ non-rectilinear and non-coherent interferences such that $P_{ext}=P_{rc}+P_{rnc}+P_{nrc}+P_{nrnc}$ and verifying the following conditions:

For rectilinear constellations:

$$2P_{int}+P_{rc}+2P_{rnc}+2P_{nrc}+4P_{nrnc} \leq 4N-2$$

For non-rectilinear constellations:

$$4P_{int}+P_{rc}+2P_{rnc}+2P_{nrc}+4P_{nrnc} \leq 4N-4$$

BRIEF DESCRIPTION OF THE DRAWINGS

Other features and advantages of the present invention will become more apparent on reading the description of an example provided by way of nonlimiting illustration only accompanied by figures in which:

FIG. 1 shows the basic principle of the Alamouti coding scheme,

FIG. 2 shows an example of a receiver of the invention for implementing the steps of the method of the invention, FIG. 3 is a summary of the parameters of the illustrative simulation.

DETAILED DESCRIPTION

Figure 4:
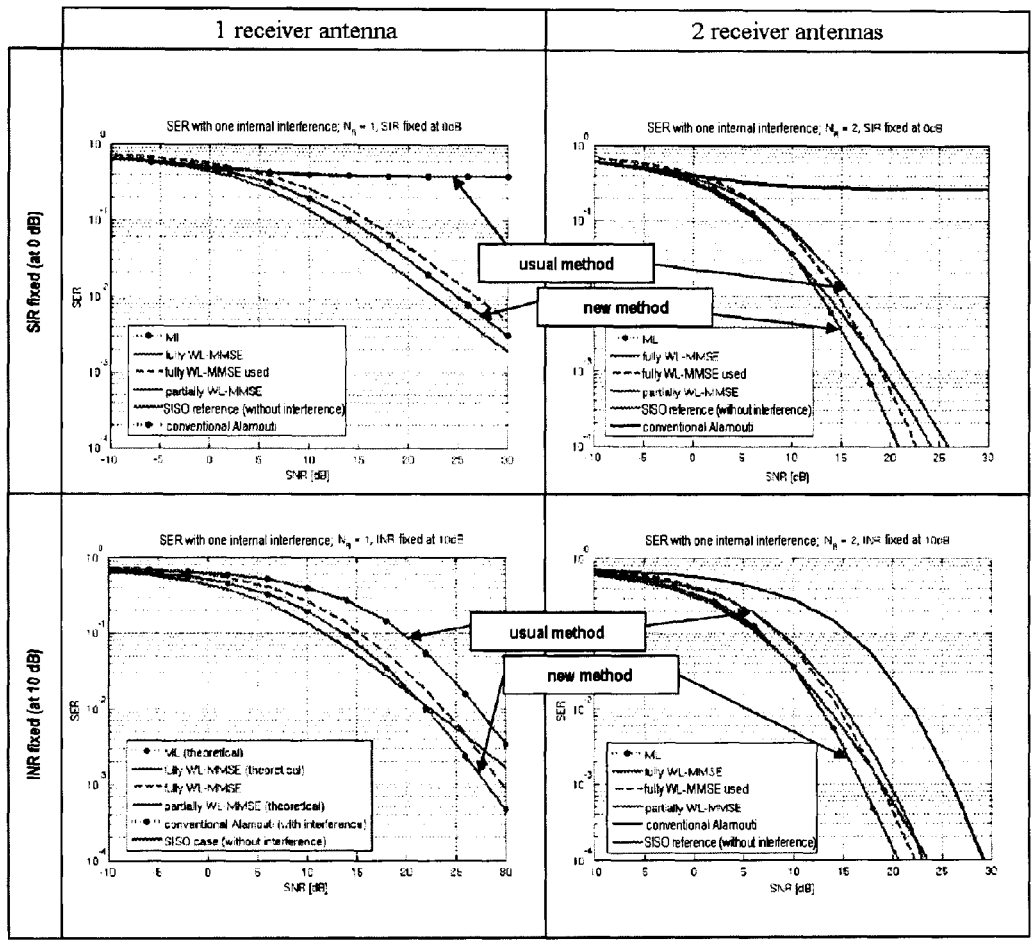
FIG. 4 illustrates the performance of the proposed receiver and certain prior art receivers in the presence of an internal interference.

To better explain the subject matter of the present invention, the following description will be given in the situation of an Alamouti type receiver system and will explain various hypotheses taken into account, as well as describing a prior art Alamouti type receiver structure.

Hypothesis, Statistics and Widely Linear Filtering

Hypotheses

A1. Observations Model

A radio communication system is considered that uses the Alamouti scheme with M=2 transmitter antennas [1] and N receiver antennas, as shown in FIG. 1. The complex envelopes $s_1(t)$ and $s_2(t)$ of the signals transmitted by the antennas 1 and 2, respectively, are defined by:

$$s_1(t) = \mu \sum_n a_{2n-1} v(t-(2n-1)T) - a_{2n} * v(t-2nT) \quad (1)$$

$$s_2(t) = \mu \sum_n a_{2n} v(t-(2n-1)T) + a_{2n-1} * v(t-2nT) \quad (2)$$

where * signifies conjugate complex, the quantities $a_n$ are independent and identically distributed (i.i.d) complex random variables corresponding to the transmitted symbols, T is the symbol time, v(t) is a raised cosine shaping filter (½ Nyquist filter), and μ is a real value that controls the instantaneous power of $s_1(t)$ and $s_2(t)$. It is assumed that the transmitted signals $s_1(t)$ and $s_2(t)$ are narrowband (BE) signals for the transmission and reception networks and that the propagation channel is constant over at least the duration of two symbol periods (and typically a burst) and generates either flat fading or ideal propagation, as a function of the broadcaster environment. The vector of the complex envelopes of the output signals of the N receiver antennas after a filtering operation adapted to the shaping filter v(t) is denoted $x_v(t)$. Under these conditions, assuming ideal synchronization in the time and frequency domains, the sample vectors $x_v((2n-1)T)$ and $x_v(2nT)$ may be written as follows:

$$x_v((2n-1)T) \triangleq x_1(n) = \mu_1 a_{2n-1} h_1 + \mu_2 a_{2n} h_2 + b_1(n) \quad (3)$$

$$x_v(2nT) \triangleq x_2(n) = -\mu_1 a_{2n} * h_1 + \mu_2 a_{2n-1} * h_2 + b_2(n) \quad (4)$$

where $\mu_i$ (i=1, 2) is a real scalar proportional to $\mu$ controlling the power of the transmitted signal $s_i(t)$ received by the array of antennas; $h_i$ (i=1, 2), such that $E[h_i^H h_i]=N$, is the normalized propagation channel vector between the transmitter antenna i and the array of receiver antennas; $b_1(n)$ and $b_2(n)$ are the sampled noise vectors at the times $(2n-1)T$ and $2nT$, respectively, potentially composed of interferences internal to the communication network, external interferences (not generated by the network itself), and background noise. Note that for frequency-selective channels, the models (3), (4) may also describe, after the discrete Fourier transform operation, the observation vectors associated with a given sub-carrier, over two consecutive OFDM symbols, of OFDM MIMO transmission using the Alamouti scheme.

FIG. 1 represents coding in accordance with equations (3) and (4) using the Alamouti scheme.

Defining the (2N×1) vectors, x(n), b(n), $f_1$, $f_2$, $f_3$ and $f_4$ by $$x(n) \triangleq [x_1(n)^T, x_2(n)^T]^T,$$
$$b(n) \triangleq [b_1(n)^T, b_2(n)^T]^T,$$
$$f_1 \triangleq [\mu_1 h_1^T, 0^T]^T,$$
$$f_2 \triangleq [\mu_2 h_2^T, 0^T]^T,$$
$$f_3 \triangleq [0^T, \mu_2 h_2^T]^T$$

and $$f_4 \triangleq [0^T, -\mu_1 h_1^T]^T$$

and defining the vectors a(n) (2×1), ã(n) (4×1) and the matrix F (2N×4) respectively by $$a(n) \triangleq [a_{2n-1}, a_{2n}]^T, \tilde{a}(n) \triangleq [a(n)^T, a(n)^H]^T$$

and $$F \triangleq [f_1, f_2, f_3, f_4],$$

equations (3) and (4) may be written in a more compact form given by:

$$x(n) = a_{2n-1} f_1 + a_{2n} f_2 + a_{2n-1}^* f_3 + a_{2n}^* f_4 + b(n) \triangleq F\tilde{a}(n) + b(n) \quad (5)$$

A2. Alternative Observations Model

Most Alamouti receivers available at present for the rejection of intra-network interference use information contained in the (2N×1) observation vector $$\bar{x}(n) \triangleq [x_1(n)^T, x_2(n)^H]^T,$$

where H signifies transposed and conjugate. By defining the (2N×1) vectors b(n), $g_1$ and $g_2$ by $$\bar{b}(n) \triangleq [b_1(n)^T, b_2(n)^H]^T, g_1 \triangleq [\mu_1 h_1^T, \mu_2 h_2^H]^T$$

and $$g_2 \triangleq [\mu_2 h_2^T, -\mu_1 h_1^H]^T,$$

by defining the (2N×2) matrix G by $$G \triangleq [g_1, g_2],$$

and by using (2) and (3), the observation vector $\bar{x}(n)$ may be written:

$$\bar{x}(n) = a_{2n-1} g_1 + a_{2n} g_2 + \bar{b}(n) \triangleq Ga(n) + \bar{b}(n) \quad (6)$$

A3. Extended Observation Model Used by the Method of the Invention

To introduce the "widely linear" filtering of x(n) hereinafter, the extended vectors $\tilde{f}_1, \tilde{f}_2, \tilde{f}_3, \tilde{f}_4, \tilde{b}(n)$ and $\tilde{x}(n)$ are defined by the respective (4N×1) vectors $$\tilde{f}_1 \triangleq [f_1^T, f_3^H]^T, \tilde{f}_2 \triangleq [f_2^T, f_4^H]^T, \tilde{f}_3 \triangleq [f_3^T, f_1^H]^T,$$
$$\tilde{f}_4 \triangleq [f_4^T, f_2^H]^T, \tilde{b}(n) \triangleq [b(n)^T, b(n)^H]^T$$

and $$\tilde{x}(n) \triangleq [x(n)^T, x(n)^H]^T.$$

By defining the (4N×4) matrix $\tilde{F}$ by $$\tilde{F} \triangleq [\tilde{f}_1, \tilde{f}_2, \tilde{f}_3, \tilde{f}_4]$$

and using (5), the vector $\tilde{x}(n)$ is written as follows:

$$\tilde{x}(n) = a_{2n-1}\tilde{f}_1 + a_{2n}\tilde{f}_2 + a_{2n-1}^* \tilde{f}_3 + a_{2n}^* \tilde{f}_4 + \tilde{b}(n) \quad (7)$$

$$\stackrel{\Delta}{=} \tilde{F}\tilde{a}(n) + \tilde{b}(n)$$

A4. Interpretation in Terms of Antenna Processing

The models (5), (6) and (7) may be interpreted from an antenna processing point of view, which is very illuminating for what follows. The model (5) describes the equivalent reception at the time nT by a virtual array of $N_e=2N$ antennas of $P_e=2$ non-correlated narrowband sources ($a_{2n-1}$ and $a_{2n}$) for rectilinear constellations (with real values) and $P_e=4$ narrowband sources not perfectly correlated ($a_{2n-1}, a_{2n}, a_{2n-1}^*, a_{2n}^*$) for non-rectilinear constellations associated with the respective virtual channel vectors $f_1+f_3$ and $f_2+f_4$ for rectilinear constellations and $f_1, f_2, f_3$ and $f_4$ for non-rectilinear constellations. Similarly, the model (6) describes the equivalent reception at the time nT by a virtual array of $N_e=2N$ antennas of $P_e=2$ sources ... BE non-correlated ($a_{2n-1}$ and $a_{2n}$) for all the constellations, associated with the virtual channel vectors $g_1$ and $g_2$, respectively. Finally, the model (7) describes the equivalent reception at the time nT by a virtual array of $N_e=4N$ antennas of $P_e=2$ non-correlated narrowband sources ($a_{2n-1}$ and $a_{2n}$) for rectilinear constellations (with real values) and $P_e=4$ not perfectly correlated narrowband sources ($a_{2n-1}, a_{2n}, a_{2n-1}^*, a_{2n}^*$) for non-rectilinear constellations associated with the respective virtual channel vectors $\tilde{f}_1+\tilde{f}_3$ and $\tilde{f}_2+\tilde{f}_4$ for rectilinear constellations and $\tilde{f}_1, \tilde{f}_2, \tilde{f}_3$ and $\tilde{f}_4$ for non-rectilinear constellations.

B. Second Order Statistics

B1. Observations Statistics

The second order observations statistics correspond to the six matrices $R_{x1}(n)$, $R_{x2}(n)$, $R_{x12}(n)$, $C_{x1}(n)$, $C_{x2}(n)$, $C_{x12}(n)$ defined, on the basis of (3) and (4), by $$R_{x1}(n) \stackrel{\Delta}{=} E[x_1(n)x_1(n)^H] \quad (8)$$
$$= \pi_1 h_1 h_1^H + \pi_2 h_2 h_2^H + R_1(n)$$
$$\stackrel{\Delta}{=} R_{s1} + R_1(n)$$

$$R_{x2}(n) \stackrel{\Delta}{=} E[x_2(n)x_2(n)^H] \quad (9)$$
$$= \pi_1 h_1 h_1^H + \pi_2 h_2 h_2^H + R_2(n)$$
$$\stackrel{\Delta}{=} R_{s2} + R_2(n)$$

$$R_{x12}(n) \stackrel{\Delta}{=} E[x_1(n)x_2(n)^H] \quad (10)$$
$$= \sqrt{\pi_1}\sqrt{\pi_2}\gamma_a [h_1 h_2^H - h_2 h_1^H] + R_{12}(n)$$
$$\stackrel{\Delta}{=} R_{s12} + R_{12}(n)$$

$$C_{x1}(n) \stackrel{\Delta}{=} E[x_1(n)x_1(n)^T] \quad (11)$$
$$= \pi_1 \gamma_a h_1 h_1^T + \pi_2 \gamma_a h_2 h_2^T + C_1(n)$$
$$\stackrel{\Delta}{=} C_{s1} + C_1(n)$$

$$C_{x2}(n) \stackrel{\Delta}{=} E[x_2(n)x_2(n)^T] \quad (12)$$
$$= \pi_1 \gamma_a^* h_1 h_1^T + \pi_2 \gamma_a^* h_2 h_2^T + C_2(n)$$
$$\stackrel{\Delta}{=} C_{s2} + C_2(n)$$

$$C_{x12}(n) \stackrel{\Delta}{=} E[x_1(n)x_2(n)^T] \quad (13)$$
$$= \sqrt{\pi_1}\sqrt{\pi_2}[h_1 h_2^T - h_2 h_1^T] + C_{12}(n)$$
$$\stackrel{\Delta}{=} C_{s12} + C_{12}(n)$$

where $$\pi_1 \stackrel{\Delta}{=} \mu_1^2 \pi_a$$

and $$\pi_2 \stackrel{\Delta}{=} \mu_2^2 \pi_a$$

are the mean powers of the signals 1 and 2, respectively, transmitted per receiver antenna, where $$\pi_a \stackrel{\Delta}{=} E[|a_n|^2];$$

$$\gamma_a = E[a_{2n-1}^2]/\pi_a;$$

$$R_1(n) \stackrel{\Delta}{=} E[b_1(n)b_1(n)^H], R_2(n) \stackrel{\Delta}{=} E[b_2(n)b_2(n)^H],$$
$$R_{12}(n) \stackrel{\Delta}{=} E[b_1(n)b_2(n)^H],$$
$$C_1(n) \stackrel{\Delta}{=} E[b_1(n)b_1(n)^T], C_2(n) \stackrel{\Delta}{=} E[b_2(n)b_2(n)^T], C_{12}(n) \stackrel{\Delta}{=} E[b_1(n)b_2(n)^T]$$

and where $R_{s1}, R_{s2}, R_{s12}, C_{s1}, C_{s2}$ and $C_{s12}$ are the six second order statistics matrices of the received useful signal. Using (5), the second order observation statistics may be written in a more compact form using matrices $R_x(n)$ and $C_x(n)$ defined by:

$$R_x(n) \stackrel{\Delta}{=} E[x(n)x(n)^H] \quad (14)$$
$$= \begin{pmatrix} R_{x1}(n) & R_{x12}(n) \\ R_{x12}(n)^H & R_{x2}(n) \end{pmatrix}$$
$$= FR_{\tilde{a}}F^H + R_b(n) \stackrel{\Delta}{=} R_s + R_b(n)$$

$$C_x(n) \stackrel{\Delta}{=} E[x(n)x(n)^T] \quad (15)$$
$$= \begin{pmatrix} C_{x1}(n) & C_{x12}(n) \\ C_{x12}(n)^T & C_{x2}(n) \end{pmatrix}$$
$$= FC_{\tilde{a}}F^T + C_b(n) \stackrel{\Delta}{=} C_s + C_b(n)$$

where $$R_b(n) \stackrel{\Delta}{=} E[b(n)b(n)^H], C_b(n) \stackrel{\Delta}{=} E[b(n)b(n)^T],$$

$R_{\tilde{a}}=E[\tilde{a}(n)\ \tilde{a}(n)^H]$, $C_{\tilde{a}}=E[\tilde{a}(n)\ \tilde{a}(n)^T]$ and where $R_S$ and $C_S$ correspond to the matrices $R_x(n)$ and $C_x(n)$, respectively, in the absence of total noise.

B2. Alternative and Extended Observations Statistics

The second order statistics of the vectors $\bar{x}(n)$ (used by the prior art methods) and $\tilde{x}(n)$ (used by the method of the invention) that are used hereinafter correspond to the matrices $R_{\tilde{x}}(n)$ and $R_{\check{x}}(n)$ respectively defined by:

Prior Art:

$$R_{\bar{x}}(n) \stackrel{\Delta}{=} E[\bar{x}(n)\bar{x}(n)^H] \qquad (16)$$

$$= \begin{pmatrix} R_{x1}(n) & C_{x12}(n) \\ C_{x12}(n)^H & R_{x2}(n)^* \end{pmatrix}$$

$$= \pi_a GG^H + R_{\bar{b}}(n) \stackrel{\Delta}{=} R_{\bar{s}} + R_{\bar{b}}(n)$$

Method of the Invention:

$$R_{\tilde{x}}(n) \stackrel{\Delta}{=} E[\tilde{x}(n)\tilde{x}(n)^H] \qquad (17)$$

$$= \begin{pmatrix} R_x(n) & C_x(n) \\ C_x(n)^* & R_x(n)^* \end{pmatrix}$$

$$= \tilde{F} R_{\tilde{a}} \tilde{F}^H + R_{\tilde{b}}(n) \stackrel{\Delta}{=} R_{\tilde{s}} + R_{\tilde{b}}(n)$$

where $R_{\bar{s}}$ and $R_{\tilde{s}}$ correspond to the matrices $R_{\bar{x}}(n)$ and $R_{\tilde{x}}(n)$, respectively, in the absence of total noise and where $$R_{\bar{b}}(n) \stackrel{\Delta}{=} E[b(n)b(n)^H]$$

and $$R_{\tilde{b}}(n) \stackrel{\Delta}{=} E[\tilde{b}(n)\tilde{b}(n)^H].$$

C. Linear and Widely Linear Filtering

The invariant in time (IT) and linear filtering of x(n) (prior art), x;(n) (prior art) and x;(n) (used to implement the method of the invention) are respectively defined by the following input-output relations:

$$y(n) = w^H x(n) = w_{11}^H x_1(n) + w_{12}^H x_2(n) \qquad (18)$$

$$y(n) = \bar{w}^H \bar{x}(n) = w_{11}^H x_1(n) + w_{22}^H x_2(n)^* \qquad (19)$$

$$y(n) = \tilde{w}^H \tilde{x}(n) = w_1^H x(n) + w_2^H x(n)^* \qquad (20)$$
$$= w_{11}^H x_1(n) + w_{21}^H x_1(n)^* + w_{12}^H x_2(n) + w_{22}^H x_2(n)^*$$

where $w_{11}, w_{12}, w_{21}$ and $w_{22}$ are complex (N×1) vectors such that $$w = w_1 \stackrel{\Delta}{=} [w_{11}^T, w_{12}^T]^T, \bar{w} \stackrel{\Delta}{=} [w_{11}^T, w_{22}^T]^T, w_2 \stackrel{\Delta}{=} [w_{21}^T, w_{22}^T]^T$$

and $$\tilde{w} \stackrel{\Delta}{=} [w_1^T, w_2^T]^T.$$

The expressions (18), (19) and (20) describe linear, partially widely linear, and fully widely linear filtering, respectively, of x(n).

Optimum Alamouti MIMO Receivers

A. Optimum Receiver in the Maximum Likelihood Sense (One Variant of the Invention)

Assuming a Gaussian and non-circular noise vector b(n), despite the fact that the intra-network interferences are not Gaussian, the probability density of b(n) is written as follows:

$$p[\tilde{b}(n)] \stackrel{\Delta}{=} \pi^{-2N} \det[R_{\tilde{b}}(n)]^{-1/2} \exp[-(1/2)\tilde{b}(n)^H R_{\tilde{b}}(n)^{-1} \tilde{b}(n)] \qquad (21)$$

Given these hypotheses, it is deduced from (7) that the optimum receiver in the maximum likelihood sense for the demodulation of the second order non-circular noise vector a(n) is such that a(n) maximizes the criterion defined by:

$$C_{nc-ml}[a(n)] \stackrel{\Delta}{=} p[\tilde{b}(n) = \tilde{x}(n) - \tilde{F}\tilde{a}(n)/a(n)] \qquad (22)$$

Using (21) in (22), it is deduced that maximizing (22) is equivalent to minimizing $C_{nc-wls}[a(n)]$ defined by:

$$C_{nc-wls}[a(n)] \stackrel{\Delta}{=} [\tilde{x}(n) - \tilde{F}\tilde{a}(n)]^H R_{\tilde{b}}(n)^{-1} [\tilde{x}(n) - \tilde{F}\tilde{a}(n)] \qquad (23)$$

The receiver that generates the vector a(n) minimizing (23) is called an NC-ML receiver (non-circular total noise ML receiver). Implementing it requires $R_{\tilde{b}}(n)$ to be known, i.e. a total noise only reference (RBS), and $\mu_1 h_1$ and $\mu_2 h_2$ to be known. This receiver exploits optimally all information contained in $R_{\tilde{b}}(n)$, i.e. in $R_1(n), R_2(n), R_{12}(n), C_1(n), C_2(n)$ and $C_{12}(n)$. This is a coupled receiver in the general case, which means that it requires the conjoint estimation of $a_{2n-1}$ and $a_{2n}$. The latter generates $M^2$ tests for the vector a(n), where M is the number of states of the constellation. This Alamouti type optimum receiver, calculated from the extended vector $\tilde{x}(n)$, is novel.

B. Prior Art Conventional Alamouti Receiver

The conventional Alamouti receiver [1] (CONV) corresponds to the foregoing optimum receiver for a circular total and white noise temporally and spatially, i.e. for $R_b(n)=\eta_2 I$ and $C_b(n)=0$, where $\eta_2$ is the mean power of the noise per receiver antenna. Given these hypotheses, minimizing (23) is equivalent to minimizing (24) and (25) defined by:

$$C_{conv,1}[a_{2n-1}] \stackrel{\Delta}{=} \qquad (24)$$
$$|a_{2n-1}|^2[\mu_1^2 h_1^H h_1 + \mu_2^2 h_2^H h_2] - 2\text{Re}[a_{2n-1}^*(\mu_1 h_1^H x_1(n) + \mu_2 h_2^T x_2(n)^*)]$$

$$C_{conv,2}[a_{2n}] \stackrel{\Delta}{=} \qquad (25)$$
$$|a_{2n}|^2[\mu_1^2 h_1^H h_1 + \mu_2^2 h_2^H h_2] - 2\text{Re}[a_{2n}^*(\mu_2 h_2^H x_1(n) - \mu_1 h_1^T x_2(n)^*)]$$

Implementing this receiver requires only $\mu_1 h_1$ and $\mu_2 h_2$ to be known. This receiver is not robust in the face of interferences.

MIMO Alamouti MMSE Receivers

An alternative to the optimum receiver (23) corresponds to the family of MMSE (Minimum Mean Square Error) receivers. These receivers are much less complex than the optimum receiver because they are decoupled and implementing them does not require the knowledge of a total noise only reference, which is what makes them of great benefit in practice. For this reason, a partially widely linear structure MMSE receiver has been proposed in the literature. This receiver proves suboptimal in some situations described in the introduction. To alleviate this limitation, there is presented a second MMSE receiver the structure of which is fully widely linear.

A. MMSE Receiver from the Literature: Partially "Widely Linear" Structure (Prior Art)

An MMSE receiver for the demodulation of the symbol $a_{2n-1}$ uses a receiver that is conventional in the maximum likelihood sense on the basis of the output of an MMSE filter for the symbol $a_{2n=1}$. An MMSE filter for the symbol $a_{2n-1}$ minimizes the mean square error EQM, $E[|a_{2n-1}-y_1(n)|^2]$, between its output $y_1(n)$ and the symbol $a_{2n-1}$.

The partially "widely linear" MMSE filter for the symbol $a_{2n-1}$ has the structure (19) where the filter $\overline{w}$ is defined by:

$$\overline{w}_{1,mmse}(n) = R_{\overline{x}}(n)^{-1} r_{\overline{x}a_{2n-1}}(n) \quad (26)$$

where it is deduced from (6) that $$r_{\overline{x}a_{2n-1}}(n) \stackrel{\Delta}{=} E[\overline{x}(n)a_{2n-1}^*] = \pi_a g 1.$$

It is then possible to show that the output $y_1(n)$ of this filter is written as follows:

$$y_1(n) = \alpha_1(n)a_{2n-1} + b_1(n) \quad (27)$$

where $a_{2n-1}$ is the symbol to be demodulated, $\alpha_1(n)$ is a real quantity and $b_1(n)$ is the overall noise for the symbol $a_{2n-1}$. Assuming a Gaussian overall noise $b_1(n)$, a receiver that is conventional in the maximum likelihood sense on the basis of $y_1(n)$ generates the symbol $a_{2n-1}$ that minimizes $|\alpha_1(n) a_{2n-1} - y_1(n)|^2$, i.e. $\alpha_1(n)|a_{2n-1}|^2 - 2\text{Re}[a_{2n-1}^* y_1(n)]$. It is thus deduced from (6) and from the foregoing analysis that the partially widely linear structure MMSE receiver generates the symbols $a_{2n-1}$ and $a_{2n}$ respectively minimizing the criteria:

$$C_{pwl,1}(a_{2n-1}) = (\overline{w}_{1,mmse}(n)^H r_{\overline{x}a_{2n-1}}(n) / \pi_a)|a_{2n-1}|^2 - 2\text{Re}[a_{2n-1}^* \overline{w}_{1,mmse}(n)^H \overline{x}(n)] \quad (28)$$

$$C_{pwl,2}(a_{2n}) = (\overline{w}_{2,mmse}(n)^H r_{\overline{x}a_{2n}}(n) / \pi_a)|a_{2n}|^2 - 2\text{Re}[a_{2n}^* \overline{w}_{2,mmse}(n)^H \overline{x}(n)] \quad (29)$$

where $$\overline{w}_{2,mmse} = R_{\overline{x}}(n)^{-1} r_{\overline{x}a_{2n}}(n) \, etr_{\overline{x}a_{2n}}(n)$$

$$\stackrel{\Delta}{=} E[\overline{x}(n)a_{2n}^*]$$

$$= \pi_a g 2.$$

An alternative to this receiver consists in replacing, at the output of the MMSE filter, the receiver that is conventional in the maximum likelihood sense by a receiver in the approximate maximum likelihood sense. Under these conditions, the modified partially widely linear structure MMSE receiver generates the symbols $a_{2n-1}$ and $a_{2n}$ respectively minimizing the criteria:

$$C_{pwl,a,1}(a_{2n-1}) = |a_{2n-1}|^2 - 2\text{Re}[a_{2n-1}^* \overline{w}_{1,mmse}(n)^H \overline{x}(n)] \quad (30)$$

$$C_{pwl,a,2}(a_{2n}) = |a_{2n}|^2 - 2\text{Re}[a_{2n}^* \overline{w}_{2,mmse}(n)^H \overline{x}(n)] \quad (31)$$

Such a receiver is proposed in the literature and its implementation requires, for the first, a knowledge of $\overline{w}_{1,mmse}(n)$, $\overline{w}_{2,mmse}(n) r_{\overline{x}a_{2n-1}}(n)$, $r_{\overline{x}a_{2n}}(n)$ and $\pi_a$ and, for the second, a knowledge of $\overline{w}_{1,mmse}(n)$, $\overline{w}_{2,mmse}(n)$. It uses all information contained in $R_{x1}(n)$, $R_{x2}(n)$ and $C_{x12}(n)$ but does not use information contained in $C_{x1}(n)$, $C_{x2}(n)$ and $R_{x12}(n)$. It thus becomes sub-optimal when at least one of these latter quantities is non-zero. This is the case in particular in the presence of intra-network interferences (i.e. interferences generated by the network itself) when the constellations used by the users are non-circular, such as ASK (Amplitude Shift Keying), BPSK (Binary Phase Shift Keying) or QAM (Quadrature Amplitude Modulation) rectangular constellations. This is also the case, for all types of constellations, in the presence of interferences external to the network, either non-circular or very narrow band.

B. Proposed MMSE Receiver: Fully Widely Linear Structure

B1. Introduction

To alleviate the limitations of the previous receiver, the method of the invention proposes to use a fully "widely linear" MMSE receiver.

The fully widely linear MMSE filter for the symbol $a_{2n-1}$ has the structure (20) in which the filter $\tilde{w}$ is defined by $$\tilde{w}_{1,mmse}(n) = R_{\tilde{x}}(n)^{-1} r_{\tilde{x}a_{2n-1}}(n) \quad (32)$$

where it is deduced from (7) that $$r_{\tilde{x}a_{2n-1}}(n) \stackrel{\Delta}{=} E[\tilde{x}(n)a_{2n-1}^*]$$

$$= \pi_a [\tilde{f}_1 + \gamma_a^* \tilde{f}_3].$$

Using the fact that $$r_{\tilde{x}a_{2n-1}}(n) \stackrel{\Delta}{=} E[\tilde{x}(n)a_{2n-1}^*]$$

$$= \pi_a [\tilde{f}_1 + \gamma_a^* \tilde{f}_3],$$

it is deduced that $$r_{\tilde{x}a_{2n-1}}(n) \stackrel{\Delta}{=} E[\tilde{x}(n)a_{2n-1}^*] \quad (33)$$

$$= \pi_a [\tilde{f}_1 + \gamma_a^* \tilde{f}_3] \text{ if } \gamma_a \neq 1$$

It is thus deduced from (7), (33) and the results of the preceding paragraph and of this paragraph that the fully widely linear structure MMSE receiver generates the symbols $a_{2n-1}$ and $a_{2n}$ respectively minimizing the criteria $C_{fwl,1}(a_{2n-1})$ and $C_{fwl,2}(a_{2n})$ defined by: For rectilinear constellations ($|\gamma_a|=1$)

$$C_{fwl,1}(a_{2n-1}) = (\tilde{w}_{1,mmse}(n)^H r_{\tilde{x}a_{2n-1}}(n)/\pi_a)|a_{2n-1}|^2 - 2\text{Re}[a_{2n-1}^* \tilde{w}_{1,mmse}(n)^H \tilde{x}(n)] \quad (34)$$

$$C_{fwl,2}(a_{2n}) = (\tilde{w}_{2,mmse}(n)^H r_{\tilde{x}a_{2n}}(n)/\pi_a)|a_{2n}|^2 - 2\text{Re}[a_{2n}^* \tilde{w}_{2,mmse}(n)^H \tilde{x}(n)] \quad (35)$$

For non-rectilinear constellations ($|\gamma_a| \neq 1$)

$$C_{fwl,1}(a_{2n-1}) = (\tilde{w}_{1,mmse}(n)^H [r_{\tilde{x}a_{2n-1}}(n) - \gamma_a^* r_{\tilde{x}a_{2n-1}}^*(n)]/\pi_a(1-|\gamma_a|^2))|a_{2n-1}|^2 - 2\text{Re}[a_{2n-1}^* \tilde{w}_{1,mmse}(n)^H \tilde{x}(n)] \quad (36)$$

$$C_{fwl,2}(a_{2n}) = (\tilde{w}_{2,mmse}(n)^H [r_{\tilde{x}a_{2n}}(n) - \gamma_a^* r_{\tilde{x}a_{2n}}^*(n)]/\pi_a(1-|\gamma_a|^2))|a_{2n}|^2 - 2\text{Re}[a_{2n}^* \tilde{w}_{2,mmse}(n)^H \tilde{x}(n)] \quad (37)$$

where $$\tilde{w}_{2,mmse}(n) = R_{\tilde{x}}(n)^{-1} r_{\tilde{x}a_{2n}}(n), \, r_{\tilde{x}a_{2n}}(n) \stackrel{\Delta}{=} E[\tilde{x}(n)a_{2n}^*]$$

and $$r^*_{\tilde{x}a_{2n}}(n) \triangleq E[\tilde{x}(n)a_{2n}].$$

An alternative to the above receiver consists in replacing, at the output of the MMSE filter, the receiver that is conventional in the maximum likelihood sense by a receiver in the approximate maximum likelihood sense. Under these conditions, the modified fully widely linear structure MMSE receiver generates the symbols $a_{2n-1}$ and $a_{2n}$ respectively minimizing the criteria defined by For rectilinear constellations ($|\gamma_a|=1$)

$$C_{fwla,1}(a_{2n-1})=|a_{2n-1}|^2-2Re[a_{2n-1}{}^*\tilde{w}_{1,mmse}(n)^H\tilde{x}(n)] \quad (38)$$

$$C_{fwla,2}(a_{2n})=|a_{2n}|^2-2Re[a_{2n}{}^*\tilde{w}_{2,mmse}(n)^H\tilde{x}(n)] \quad (39)$$

For non-rectilinear constellations ($|\gamma_a|\neq 1$)

$$C_{fwla,1}(a_{2n-1})=|a_{2n-1}|^2-2Re[a_{2n-1}{}^*\tilde{w}_{1,mmse}(n)^H\tilde{x}(n)] \quad (40)$$

$$C_{fwla,2}(a_{2n})=|a_{2n}|^2-2Re[a_{2n}{}^*\tilde{w}_{2,mmse}(n)^H\tilde{x}(n)] \quad (41)$$

Implementing this receiver requires, for the first alternative, a knowledge of $\tilde{w}_{1,mmse}(n)$, $\tilde{w}_{2,mmse}(n)$, $r_{\tilde{x}a_{2n-1}}(n)$, $r_{\tilde{x}a_{2n-1}}{}^*(n)$, $r_{\tilde{x}a_{2n}}(n)$, $r_{\tilde{x}a_{2n}}{}^*(n)$, $\gamma_a$ and $\pi_a$ and for the second alternative a knowledge of $\tilde{w}_{1,mmse}(n)$ and $\tilde{w}_{2,mmse}(n)$. This receiver uses all information contained in $R_{x1}(n)$, $R_{x2}(n)$, $R_{x12}(n)$, $C_{x1}(n)$, $C_{x2}(n)$ and $C_{x12}(n)$. It can be shown that for rectilinear constellations, the receiver (34), (35) corresponds to the optimum receiver (23) regardless of the channels $h_1$ and $h_2$ if the total noise verifies the condition C1 defined by:

C1: $R_1(n)=R_2(n)$; $C_1(n)=C_2(n)$; $R_{12}(n)^H \approx R_{12}(n)$; $C_{12}(n)^T \approx C_{12}(n)$ (42)

which is the case in particular in the presence of intra-network interferences.

FIG. 2 is a functional diagram of a device or system enabling implementation of the steps of the method of the invention.

The system includes N receiver antennas $10_1, \ldots 10i, 10_N$ connected to a first processing module 11 for processing received signals supplying the extended signal *x*(2n−1), *x*(2n), *x*(2n−1)*, *x*(2n)*. The extended signals are then transmitted to a mean quadratic linear filter 12 in order to be shaped before being transmitted to an ML type module 13 enabling estimation of the symbols.

B2. Maximum Number of Interferences Processed

It is assumed in this paragraph that the total noise b(n) is composed of $P_{int}$ synchronous intra-network interferences, corresponding to other Alamouti users of the network with the same constellation, $P_{ext}$ external interferences, coming from other networks or from interference and background noise. An external interference i is rectilinear if its complex envelope $m_i(t)$ is such that $m_i(t)^*=m_i(t)\ e^{j\Phi i}$ and non-rectilinear otherwise. It is called coherent if $m_i((2n-1)T) \approx m_i(2nT)\ e^{j\psi i}$ and non-coherent otherwise. A coherent interference corresponds to a very narrow band signal compared to the band of the users of the network. Given these hypotheses, it is assumed that the $P_{ext}$ external interferences are composed of $P_{rc}$ rectilinear and coherent interferences, $P_{rnc}$ rectilinear and non-coherent interferences, $P_{nrc}$ non-rectilinear and coherent interferences, and $P_{nrnc}$ non-rectilinear and non-coherent interferences such that $P_{ext}=P_{rc}+P_{rnc}+P_{nrc}+P_{nrnc}$. Given these hypotheses, it is deduced from (7) and the results of the antenna processing that the maximum number of interferences $P=P_{int}+P_{ext}$ that may be rejected by the fully "widely linear" structure MMSE receiver verifies the following conditions:

For rectilinear constellations:

$$2P_{int}+P_{rc}+2P_{rnc}+2P_{nrc}+4P_{nrnc} \leq 4\tilde{N}-2 \quad (43)$$

For non-rectilinear constellations:

$$4P_{int}+P_{rc}+2P_{rnc}+2P_{nrc}+4P_{nrnc} \leq 4\tilde{N}-4 \quad (44)$$

It is deduced from this result that in the absence of external interferences, $P_{int} \leq \tilde{N}-1$ for non-rectilinear constellations while $P_{int} \leq 2\tilde{N}$ for rectilinear constellations. In this latter case, the proposed receiver enables rejection of one internal interference from only one antenna whence extension of the SAIC concept to MISO systems using the Alamouti scheme, which the partially "widely linear" MMSE receiver does not allow.

B3. Implementation

In practice, the quantities $R_x(n)$, $r_{\tilde{x}a_{2n-1}}(n)$, $r_{\tilde{x}a_{2n-1}}{}^*(n)$, $r_{\tilde{x}a_{2n}}(n)$ and $r_{\tilde{x}a_{2n}}{}^*(n)$ are not known a priori and must be estimated from learning sequences introduced into the ST coding scheme. Assuming that the foregoing quantities are invariant over the duration of the sequence constituted of K known Alamouti blocks of two symbols, the foregoing quantities may be estimated by the respective expressions:

$$\hat{R}_{\tilde{x}}(n) \triangleq \frac{1}{K}\sum_{k=1}^{K}\tilde{x}((n+k-1)T)\tilde{x}((n+k-1)T)^\dagger \quad (45)$$

$$\hat{r}_{\tilde{x}a_{2n-1}}(n) \triangleq \frac{1}{K}\sum_{k=1}^{K}\tilde{x}((n+k-1)T)a_2(n+k-1)-1^* \quad (46)$$

$$\hat{r}^*_{\tilde{x}a_{2n-1}}(n) \triangleq \frac{1}{K}\sum_{k=1}^{K}\tilde{x}((n+k-1)T)a_2(n+k-1)-1 \quad (47)$$

$$\hat{r}_{\tilde{x}a_{2n}}(n) \triangleq \frac{1}{K}\sum_{k=1}^{K}\tilde{x}((n+k-1)T)a_2(n+k-1)^* \quad (48)$$

$$\hat{r}^*_{\tilde{x}a_{2n}}(n) \triangleq \frac{1}{K}\sum_{k=1}^{K}\tilde{x}((n+k-1)T)a_2(n+k-1) \quad (49)$$

where † refers to complex conjugate of a vector and ^ refers to an estimate of a corresponding variable, as known to one of ordinary skill in the art.

B4. Performance and Advantages of the Method and the System of the Invention

The performance of the fully "widely linear" structure MMSE receiver, conjointly with partially "widely linear" ML, MMSE receivers and conventional Alamouti receivers, are shown in FIG. 4 for an ASK constellation with four states in the presence of an internal interference. These figures show the variations of the symbol error rate as a function of the input SNR (dB) for N=1 and N=2 sensors, when the SNR and the INR are respectively such that SNR/INR=0 dB and INR=10 dB.

The channel is taken as constant over a burst and the error rates are obtained by averaging over a large number of bursts. The various numerical values used in the simulations are summarized in FIG. 3.

Note that the proposed receiver is the optimum for an internal interference and its better performance than the partially "widely linear" MMSE receiver. For its part the conventional Alamouti receiver is inoperative when the SNR/INR ratio is low.

REFERENCES

[1] S. M. ALAMOUTI, "A simple transmit diversity technique for wireless communications", *IEEE Journal on Selected areas in Communications*, Vol 16, No 8, pp. 1451-1458, October 1998.

[22] A. F. NAGUIB, N. SESHADRI, A. R. CALDERBANK, "Applications of space-time block codes and interference suppression for high capacity and high data rate wireless systems", *Proc. 32th Annual Asilomar Conference on Signals, Systems and Computer*, pp. 1803-1810, Pacific Grove, Calif., November 1998.

[23] A. NAGUIB, N. SESHADRI, A. R. CALDERBANK, "Space-time coding and signal processing for high data rate wireless communications", *IEEE Signal Processing Magazine*, Vol 17, No 3, pp. 76-92, May 2000.

The invention claimed is:

1. A method for separating a plurality of user signals in a communication system including two transmitter antennas and N receiver antennas, the method comprising:
   receiving respective signals of the N receiver antennas, and transmitted by a plurality of users containing symbols; and
   applying a shaping filtering operation to a vector of the envelopes of the received signals for reducing intra-network or extra-network interferences, to output separated user signals respectively corresponding to two symbols that are Orthogonal Frequency Division Multiplexed, wherein the shaping filtering operation uses a linear mean square filter extended over an observation vector $\tilde{x}=[x(2n-1)^T \; x(2n)^T \; x(2n-1)^H \; x(2n)^H]^T$ where $x(2n-1)$ and $x(2n)$ correspond to the (N×1) (N≥1) observations at the symbol times $2n-1$ and $2n$, said observation vector being associated with the two symbols.

2. The method according to claim 1 wherein for an arbitrary number N≥1 of sensors, for users of a communication network using the Alamouti scheme on transmission and in the presence of external interferences, symbols $a_{2n-1}$ and $a_{2n}$ used are the symbols minimizing respective criteria $C_{fwl,1}(a_{2n-1})$ and $C_{fwl,2}(a_{2n})$ defined by:

for rectilinear constellations ($|\gamma_a|=1$)

$$C_{fwl,1}(a_{2n-1})=(\tilde{w}_{1,mmse}(n)^H r_{\tilde{x}a_{2n-1}}(n)/\pi_a)|a_{2n-1}|^2-2Re[a_{2n-1}^*\tilde{w}_{1,mmse}(n)^H \tilde{x}(n)]$$

$$C_{fwl,2}(a_{2n})=(\tilde{w}_{2,mmse}(n)^H r_{\tilde{x}a_{2n}}(n)/\pi_a)|a_{2n}|^2-2Re[a_{2n}^*\tilde{w}_{2,mmse}(n)^H \tilde{x}(n)]$$

for non-rectilinear constellations ($|\gamma_a|\neq 1$)

$$C_{fwl,1}(a_{2n-1})=(\tilde{w}_{1,mmse}(n)^H[r_{\tilde{x}a_{2n-1}}(n)-\gamma_a^* r_{\tilde{x}a_{2n-1}}^*(n)]/\pi_a(1-|\gamma_a|^2))|a_{2n-1}|^2-2Re[a_{2n-1}^*\tilde{w}_{1,mmse}(n)^H \tilde{x}(n)]$$

$$C_{fwl,2}(a_{2n})=(\tilde{w}_{2,mmse}(n)^H[r_{\tilde{x}a_{2n}}(n)-\gamma_a^* r_{\tilde{x}a_{2n}}^*(n)]/\pi_a(1-|\gamma_a|^2))|a_{2n}|^2-2Re[a_{2n}^*\tilde{w}_{2,mmse}(n)^H \tilde{x}(n)]$$

where
$\tilde{w}_{1,mmse}(n)=R_{\tilde{x}}(n)^{-1}r_{\tilde{x}a_{2n-1}}(n)$,
$\tilde{w}_{2,mmse}(n)=R_{\tilde{x}}(n)^{-1}r_{\tilde{x}a_{2n}}(n)$, $r_{\tilde{x}a_{2n}}(n)\underline{\Delta}E[\tilde{x}(n)\,a_{2n}^*]$ $$R_{\tilde{x}}(n) \triangleq E[\tilde{x}(n)\tilde{x}(n)^H], \; r_{\tilde{x}a_{2n-1}}(n) \triangleq E[\tilde{x}(n)a_{2n-1}^*],$$

$$r_{\tilde{x}a_{2n-1}}^*(n) \triangleq E[\tilde{x}(n)a_{2n-1}], \; r_{\tilde{x}a_{2n}}(n) \triangleq E[\tilde{x}(n)a_{2n}^*],$$

$$r_{\tilde{x}a_{2n}}^*(n) \triangleq E[\tilde{x}(n)a_{2n}],$$

wherein $\tilde{w}\underline{\Delta}[w_1^T, w_2^T]^T$, such that $w=w_1\underline{\Delta}[w_{11}^T, w_{12}^T]^T$, $\overline{w}\underline{\Delta}[w_{11}^T, \overline{w_{22}^T}]^T$, $w_2\underline{\Delta}[w_{21}^T, w_{22}^T]^T$, where $w_{11}, w_{12}, w_{21}$ and $\overline{w}_{22}$ are complex N×1 vectors, $\gamma_a=E[a_{2n-1}^2]/\pi_a$ with E being an error operator for variables included inside respective brackets, and R is a second order statistics vector of corresponding variable in subscript position.

3. The method according to claim 2, wherein for an arbitrary number N≥1 of sensors, for users of a communication network using the Alamouti scheme on transmission and in the presence of external interferences where appropriate, the minimizing of the criteria for the rectilinear constellations and for the non-rectilinear constellations, where $\tilde{w}_{1,mmse}(n)=R_{\tilde{x}}(n)^{-1}r_{\tilde{x}a_{2n-1}}(n)$ and $\tilde{w}_{2,mmse}(n)=R_{\tilde{x}}(n)^{-1}r_{\tilde{x}a_{2n}}(n)$ and where exact statistics $R_{\tilde{x}}(n), r_{\tilde{x}a_{2n-1}}(n), r_{\tilde{x}a_{2n-1}}^*(n), r_{\tilde{x}a_{2n}}(n)$ and $r_{\tilde{x}a_{2n}}^*(n)$ are replaced by estimates thereof over a duration corresponding to K known blocks of two symbols, where the estimates are given by:

$$\hat{R}_{\tilde{x}}(n) \triangleq \frac{1}{K}\sum_{k=1}^{K}\tilde{x}((n+k-1)T)\tilde{x}((n+k-1)T)^\dagger$$

$$\hat{r}_{\tilde{x}a_{2n-1}}(n) \triangleq \frac{1}{K}\sum_{k=1}^{K}\tilde{x}((n+k-1)T)a_2(n+k-1)-1^*$$

$$\hat{r}_{\tilde{x}a_{2n-1}}^*(n) \triangleq \frac{1}{K}\sum_{k=1}^{K}\tilde{x}((n+k-1)T)a_2(n+k-1)-1$$

$$\hat{r}_{\tilde{x}a_{2n}}(n) \triangleq \frac{1}{K}\sum_{k=1}^{K}\tilde{x}((n+k-1)T)a_2(n+k-1)^*$$

$$\hat{r}_{\tilde{x}a_{2n}}^*(n) \triangleq \frac{1}{K}\sum_{k=1}^{K}\tilde{x}((n+k-1)T)a_2(n+k-1),$$

wherein $\tilde{w}\underline{\Delta}[w_1^T, w_2^T]^T$, such that $w=w_1\underline{\Delta}[w_{11}^T, w_{12}^T]^T$, $\overline{w}\underline{\Delta}[w_{11}^T, \overline{w_{22}^T}]^T$, $w_2\underline{\Delta}[w_{21}^T, w_{22}^T]^T$, where $\overline{w}_{11}, w_{12}, w_{21}$ and $\overline{w}_{22}$ are complex N×1 vectors, † refers to complex conjugate of a vector, and the subscript mmse refers to minimum mean square error.

4. The method according to claim 1 wherein for an arbitrary number N≥1 of sensors, for users of a communication network using the Alamouti scheme on transmission and in the presence of external interferences where appropriate, symbols $a_{2n-1}$ and $a_{2n}$ used are the symbols minimizing respective criteria $C_{fwl,a,1}(a_{2n-1})$ and $C_{fwl,a,2}(a_{2n})$ defined by:

For rectilinear constellations ($|\gamma_a|=1$):

$$C_{fwl,a,1}(a_{2n-1})=|a_{2n-1}|^2-2Re[a_{2n-1}^*\tilde{w}_{1,mmse}(n)^H\tilde{x}(n)]$$

$$C_{fwl,a,2}(a_{2n})=|a_{2n}|^2-2Re[a_{2n}^*\tilde{w}_{2,mmse}(n)^H\tilde{x}(n)]$$

For non-rectilinear constellations ($|\gamma_a|\neq 1$):

$$C_{fwl,a,1}(a_{2n-1})=|a_{2n-1}|^2-2Re[a_{2n-1}^*\tilde{w}_{1,mmse}(n)^H\tilde{x}(n)]$$

$$C_{fwl,a,2}(a_{2n})=|a_{2n}|^2-2Re[a_{2n}^*\tilde{w}_{2,mmse}(n)^H\tilde{x}(n)]$$

where $\tilde{w}_{1,mmse}(n)=R_{\tilde{x}}(n)^{-1}r_{\tilde{x}a_{2n-1}}(n)$, $\tilde{w}_{2,mmse}(n)=R_{\tilde{x}}(n)^{-1}r_{\tilde{x}a_{2n}}(n)$, wherein $\overline{w}\underline{\Delta}[w_1^T, w_2^T]^T$, such that $w=w_1\underline{\Delta}[w_{11}^T, w_{12}^T]^T$, $\overline{w}\underline{\Delta}[\overline{w}_{11}^T, w_{22}^T]^T$, $w_2\underline{\Delta}[w_{21}^T, w_{22}^T]^T$, where $w_{11}, w_{12}, \overline{w_{21}}$ and $w_{22}$ are complex N×1 vectors and the subscript mmse refers to minimum mean square error.

5. The method according to claim 4, wherein for an arbitrary number N≥1 of sensors, for users of a communication network using the Alamouti scheme on transmission and in the presence of external interferences where appropriate, the minimization of the criteria for the rectilinear constellations and for the non-rectilinear constellations, where $\tilde{w}_{1,mmse}(n)=R_{\tilde{x}}(n)^{-1}r_{\tilde{x}a_{2n-1}}(n)$ and $\tilde{w}_{2,mmse}(n)=R_{\tilde{x}}(n)^{-1}r_{\tilde{x}a_{2n}}(n)$ and where the exact statistics $R_{\tilde{x}}(n)$, $r_{\tilde{x}a_{2n-1}}(n)$, $r_{\tilde{x}a_{2n}}(n)$ are replaced by the estimates thereof over a duration corresponding to K known blocks of two symbols, where the estimates are given by:

$$\hat{R}_{\tilde{x}}(n) \triangleq \frac{1}{K}\sum_{k=1}^{K} \tilde{x}((n+k-1)T)\tilde{x}((n+k-1)T)^{\dagger}$$

$$\hat{r}_{\tilde{x}a_{2n-1}}(n) \triangleq \frac{1}{K}\sum_{k=1}^{K} \tilde{x}((n+k-1)T)a_2(n+k-1)-1^*$$

$$\hat{r}_{\tilde{x}a_{2n}}(n) \triangleq \frac{1}{K}\sum_{k=1}^{K} \tilde{x}((n+k-1)T)a_2(n+k-1)^*,$$

wherein where † refers to complex conjugate of a vector and ˆ refers to an estimate of a corresponding variable.

6. The method according to claim 1 wherein for an arbitrary number N≥1 of sensors, for users of a communication network using the Alamouti scheme on transmission and in the presence of external interferences where appropriate, symbols $a_{2n-1}$ and $a_{2n}$ used are the symbols minimizing criterion defined by:

$$C_{nc\text{-}wls}[a(n)] \triangleq \left[\tilde{x}(n) - \tilde{F}\tilde{a}(n)\right]^H R_{\tilde{b}}(n)^{-1}\left[\tilde{x}(n) - \tilde{F}\tilde{a}(n)\right]$$

where $$\tilde{x}(n) \triangleq [x(n)^T, x(n)^H]^T, \tilde{F} \triangleq [\tilde{f}_1, \tilde{f}_2, \tilde{f}_3, \tilde{f}_4], \tilde{f}_1 \triangleq [f_1^T, f_3^H]^T,$$

$$\tilde{f}_2 \triangleq [f_2^T, f_4^H]^T, \tilde{f}_3 \triangleq [f_3^T, f_1^H]^T, \tilde{f}_4 \triangleq [f_4^T, f_2^H]^T,$$

$$f_1 \triangleq [\mu_1 h_1^T, 0^T]^T, f_2 \triangleq [\mu_2 h_2^T, 0^T]^T, f_3 \triangleq [0^T, \mu_2 h_2^T]^T,$$

$$f_4 \triangleq [0^T, -\mu_1 h_1^T]^T, \tilde{a}(n) \triangleq [a(n)^T, a(n)^H]^T, a(n) \triangleq [a_{2n-1}, a_{2n}]^T,$$

$$R_{\tilde{b}}(n) \triangleq E\left[\tilde{b}(n)\tilde{b}(n)^H\right], \tilde{b}(n) \triangleq [b(n)^T, b(n)^H]^T.$$

wherein $\tilde{f}_1, \tilde{f}_2, \tilde{f}_3, \tilde{f}_4$ are extended vectors defining $\tilde{F}$ such that $\tilde{f}_1 \underline{\triangleq} [f_1^T, f_2^H]^T$, $\tilde{f}_2 \underline{\triangleq} [f_2^T, f_4^H]^T$, $\tilde{f}_3 \underline{\triangleq} [f_3^T, f_1^H]^T$ and $\tilde{f}_4 \underline{\triangleq} [f_4^T, f_2^H]^T$ with $f_1 \underline{\triangleq} [\mu_1 h_1^T, \overline{0^T}]^T$, $f_2 \underline{\triangleq} [\mu_2 h_2^T, 0^T]^T$, $f_3 \underline{\triangleq} [0^T, \mu_2 \overline{h_2^T}]^T$, and $f_4$ $\underline{\triangleq} [0^T, -\mu_1 h_1^T]^T$, with $\mu_i$ (i=1, 2) is a real scalar proportional to $\overline{\mu}$ controlling a power of the respective transmitted signals, hi (i=1, 2) such that $E[h_i^H h_i] = N$ is a normalized propagation channel vector between a transmitter antenna i and an array of receiver antennas.

7. The method according to claim 6 wherein for an arbitrary number N≥1 of sensors, for users of a communication network using the Alamouti scheme on transmission and in the presence of external interferences where appropriate, the symbols $a_{2n-1}$ and $a_{2n}$ used are the symbols minimizing the criterion defined by:

$$C_{nc\text{-}wls}[a(n)] \triangleq \left[\tilde{x}(n) - \tilde{F}\tilde{a}(n)\right]^H R_{\tilde{b}}(n)^{-1}\left[\tilde{x}(n) - \tilde{F}\tilde{a}(n)\right]$$

where $\mu_1 h_1$, $\dashv \mu_2 h_2$ and $R_{\tilde{b}}(n)$ are replaced by the estimates thereof.

8. A system for separating a plurality of users in a communication system including two transmitter antennas and N receiver antennas, said signals transmitted by said users containing symbols $a_n$, x( ) corresponding to the vector of the envelopes of the output signals of the 1 to N receiver antennas after the shaping filtering operation, the system comprising a processor adapted to execute these steps according to claim 1.

9. The system according to claim 8, wherein the receiver is a Minimum Mean Square Error (MMSE) receiver comprising the receiver antennas.

10. The method according to claim 1, further comprising:
processing from an array of N≥1 sensors, $P_{int}$ interferences internal and $P_{ext}$ interferences external to the network composed of $P_{rc}$ rectilinear and coherent interferences, $P_{rnc}$ rectilinear and non-coherent interferences, $P_{nrc}$ non-rectilinear and coherent interferences, and $P_{nrnc}$ non-rectilinear and non-coherent interferences such that $P_{ext} = P_{rc} + P_{rnc} + P_{nrc} + P_{nrnc}$ and verifying the following conditions:

For rectilinear constellations:

$$2P_{int} + P_{rc} + 2P_{rnc} + 2P_{nrc} + 4P_{nrnc} \leq 4N-2$$

For non-rectilinear constellations:

$$4P_{int} + P_{rc} + 2P_{rnc} + 2P_{nrc} + 4P_{nrnc} \leq 4N-4.$$

* * * * *